US008665829B2

(12) United States Patent
Park et al.

(10) Patent No.: US 8,665,829 B2
(45) Date of Patent: Mar. 4, 2014

(54) METHOD FOR CONTROLLING DEVICES BASED ON NFC AND DEVICE CONTROL SYSTEM USING THE SAME

(75) Inventors: Ken-Ha Park, Seoul (KR); Sang-Won Yoon, Gyeonggi-do (KR); Woo-Il Kwon, Gyeonggi-do (KR); Moon-Kyeong Park, Seoul (KR)

(73) Assignee: Infraware, Inc., Seoul (KR)

( * ) Notice: Subject to any disclaimer, the term of this patent is extended or adjusted under 35 U.S.C. 154(b) by 97 days.

(21) Appl. No.: 13/305,061

(22) Filed: Nov. 28, 2011

(65) Prior Publication Data

US 2012/0236820 A1    Sep. 20, 2012

(30) Foreign Application Priority Data

Mar. 15, 2011   (KR) .......................... 10-2011-0022704

(51) Int. Cl.
   *H04W 4/00* (2009.01)
(52) U.S. Cl.
   USPC ........................................ 370/331; 455/436
(58) Field of Classification Search
   USPC .............. 370/310.2, 324, 328, 338, 350, 331,
         370/347; 709/232, 238, 237, 236, 227;
         455/403, 436, 442
   See application file for complete search history.

(56) References Cited

U.S. PATENT DOCUMENTS

| 7,277,733 B2 * | 10/2007 | Ko et al. ...................... 455/566 |
| 2011/0145049 A1 * | 6/2011 | Hertel et al. ............... 705/14.23 |

FOREIGN PATENT DOCUMENTS

| KR | 10-2005-0002182 | 1/2005 |
| KR | 10-2008-0002835 | 1/2008 |
| KR | 10-2010-0058527 | 6/2010 |

\* cited by examiner

*Primary Examiner* — Brenda H Pham
(74) *Attorney, Agent, or Firm* — Greenblum & Bernstein, P.L.C.

(57) ABSTRACT

A method for controlling a service device through a smart terminal based on near field communication (NFC) includes the steps of: activating NFC between the smart terminal and the service device; handing over the communication between the smart terminal and the service device to a secondary network through the NFC; executing, by the start terminal, a web contents execution program; providing, by the service device, control codes to the smart terminal; preparing, by the smart terminal, to utilize the control codes; displaying, by the smart terminal, a control/service screen of the service device on the web contents execution program by utilizing the control codes; detecting, by the web contents execution program, a user manipulation on the control/service screen; and transmitting, by the web contents execution program, a request defined in the control codes to the service device in response to the user manipulation.

7 Claims, 6 Drawing Sheets

METHOD FOR CONTROLLING DEVICES BASED ON NFC AND DEVICE CONTROL SYSTEM USING THE SAME

CROSS-REFERENCE(S) TO RELATED APPLICATIONS

The present application claims priority of Korean Patent Application No(s). 10-2011-0022704, filed on Mar. 15, 2011, which is incorporated herein by reference in its entirety.

BACKGROUND OF THE INVENTION

1. Field of the Invention

Exemplary embodiments of the present invention relate to a method for controlling a neighboring service device through a smart terminal based on near field communication (NFC) and a device control system using the same. In the method, when a user places a smart terminal near a service device in a state in which control codes (for example, web contents or extension module) are previously provided in the service device, NFC automatically activated to set a communication channel, the smart terminal is handed over to a secondary network (for example, wireless LAN), and a web contents execution program (for example, browser) loads web contents from the service device or an extension module is installed in the smart terminal to control the service device.

2. Description of Related Art

Recently, the use of a smart terminal such as a smart terminal or smart pad has widely spread, and a variety of attempts to control a variety of electronic devices through such a smart terminal have been made by steps. For such a control operation, device control software and a driver program, which are designed for a target electronic device, should be installed in the smart terminal, and software provided as a package should be additionally installed in the target electronic device. Then, the target electronic device may be controlled.

As such, when software should be previously installed in a smart terminal to control a specific electronic device through the smart terminal, the entire process may become complicated. In particular, when such a preparation process is not previously performed, the smart terminal cannot control the electronic device at all. In this case, the utilization of the smart terminal inevitably decreases. Furthermore, a user of the smart terminal should prepare device control software for each device. Furthermore, since various operation systems such as android and iOS may be used in smart terminals, manufacturers which develop electronic devices should develop software for each of the operation systems.

Meanwhile, much research has been actively conducted on technology utilizing NFC. The NFC refers to a near field wireless access standard using magnetic induction between neighboring devices. As an open platform technology standardized in ECMA-340 and ISO/IEC 18092, the NFC is a touch-based technology in which when a user touches a smart terminal by the finger, different devices are connected to each other and which transmits data at a maximum rate of 212 kbps in the range of 20 cm by using a frequency of 13.56 MHz. It is expected that the NFC will be utilized for electronic products such as a mobile phone, a digital camera, a handheld, and a personal computer. Accordingly, embodiments of the present invention provide a technology capable of overcoming the problems of the conventional technology by using the NFC.

SUMMARY OF THE INVENTION

An embodiment of the present invention is directed to a technology which enables a user to check the states of various electronic devices and control the functions thereof through a start terminal even though control programs for the electronic devices are not previously installed in the smart terminal.

Another embodiment of the present invention is directed to a device control system which is configured based on NFC, implements a control environment for a service device in a smart terminal when a user simply places the smart terminal near the service device, and enables the user to conveniently control the service.

In accordance with an embodiment of the present invention, there is a method for controlling a service device through a smart terminal based on NFC. The method comprising the steps of: (a) activating NFC between the smart terminal and the service device; (b) handing over the communication between the smart terminal and the service device to a secondary network through the NFC; (c) executing, by the start terminal, a web contents execution program; (d) providing, by the service device, control codes to the smart terminal; (e) preparing, by the smart terminal, to utilize the control codes; (f) displaying, by the smart terminal, a control/service screen of the service device on the web contents execution program by utilizing the control codes; (g) detecting, by the web contents execution program, a user manipulation on the control/service screen; and (h) transmitting, by the web contents execution program, a request defined in the control codes to the service device in response to the user manipulation.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
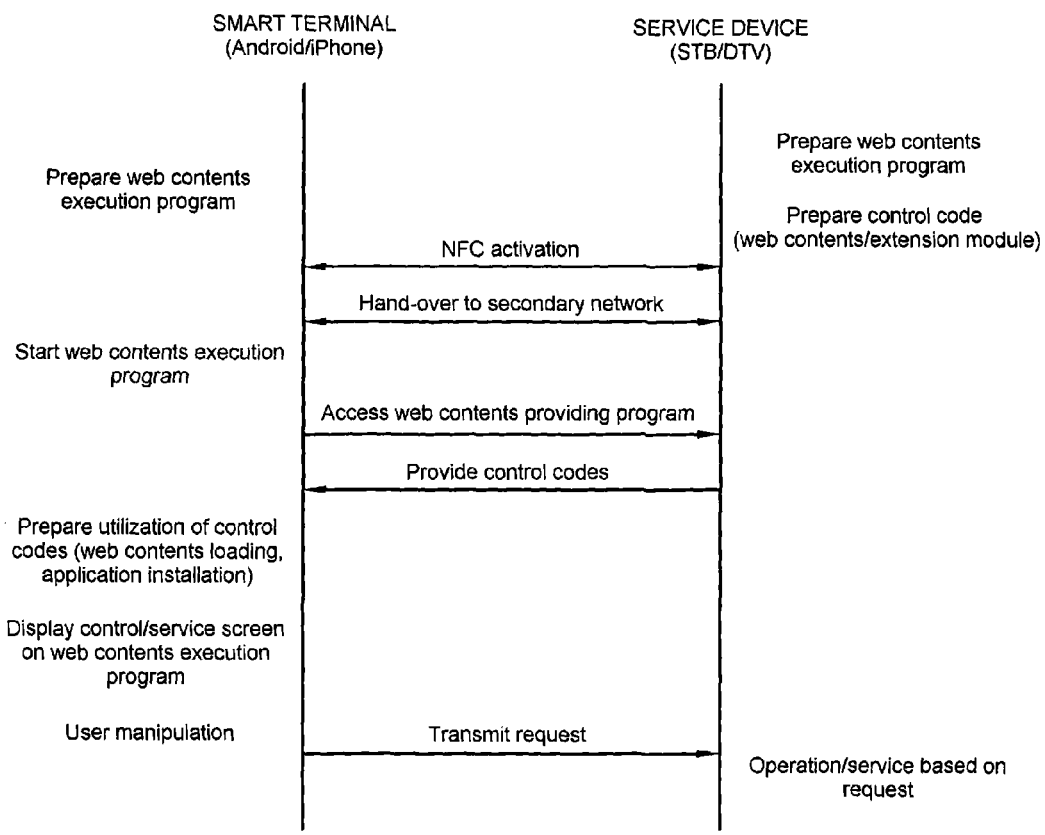
FIG. 1 is a diagram showing a process of controlling a service device through a smart terminal according to an embodiment of the present invention.

FIG. 1 is a diagram showing a process of controlling a service device through a smart terminal, based on a device control method according to an embodiment of the present invention. The smart terminal may include an android phone, an i-phone and so on, and the service device may include a set-top box, a digital TV, an electronic frame, an air conditioner and so on.

First, NFC is activated between the smart terminal and the service device. The smart terminal and the service device include NFC modules installed therein, respectively. When a user places the smart terminal near the service device, the NFC is automatically activated, and an NFC channel is set between the smart terminal and the service device.

Subsequently, according to a procedure defined in the NFC standards, the smart terminal and the service device are automatically handed over to a secondary network. In the case of wireless LAN (WiFi), when the communication begins through the NFC channel, the smart terminal and the service device read each other's NFC tags, and acquire the information on the WiFi hand-over through the read NFC tags. As the smart terminal and the service device confirm that they are designed to be handed over to the WiFi, the smart terminal and the service device automatically perform the hand-over to the WiFi. At this time, when the smart terminal and the service device perform the hand-over to the WiFi, sufficient communication speed may be secured, and communication on the TCP/IP protocol may be smoothly performed in a subsequent process.

In this embodiment of the present invention, the kind of a network which is handed over from the NFC is not limited to the WiFi, and a variety of communication technologies such as Bluetooth, Zigbee, and UWB may be adopted and utilized. That is, the WiFi is only an example of a network which is handed over. Accordingly, in this specification, a network which is handed over will be referred to as 'secondary network'.

When a high-speed communication channel is set by using the secondary network, the smart terminal executes a web contents execution program, for example, a web browser, and then accesses a web contents providing program of the service device, for example, a web server. The web contents execution program of the smart terminal provides a user interface (UI) for checking the state of the service device and performing device control. The web contents providing program of the service device provides a variety of services for the web contents execution program. The service device includes control codes, for example, web contents or an extension module such as an application. Through the control codes, the service device may be controlled by an external device or may provide a device service.

The web contents are loaded by the web contents execution program to provide a device control/service screen. The web contents are suitable for simply checking the state of the service device or simply controlling various functions.

On the other hand, the extension module is installed in the smart terminal such that unique functions of the smart terminal may be utilized in the outside. For example, the extension module may read a gyro sensor value of the smart terminal and transmit the read value to the service device, or read message database (SMS DB) information and universal subscriber identity module (USIM) personal information stored in the smart terminal and transmit the read information to the service device. The extension module may be implemented in such a form as a plug-in program, iOS application, or android application.

The installation of the extension module may be performed in various manners. The service device may store the extension module in a binary form, and transmit the stored extension module to the smart terminal through the communication with the web contents execution program of the smart terminal to install the extenuation module. In this case, the extension module in a binary form serves as the control codes. The web contents providing program of the service device may discriminate the type and OS version of the smart terminal through a user agent provided by the web contents execution program of the smart terminal. Meanwhile, the program codes of the extension module may be stored in an application market (app-market), and the service device may include link information for downloading and installing the program codes and provide the link information to the smart terminal in response to a request from the smart terminal. In this case, the link information serves as the control codes.

The method of using the extension module is suitable for more complex control. For example, when a user uses the smart terminal as a game consol while executing a racing gate in the service device, the extension module may periodically read the gyro-sensor values of the smart terminal to transmit to the smart terminal. Then, the user may manipulate the smart terminal to enjoy the racing game in the service device.

The web contents execution program of the smart terminal requests the control codes from the web contents providing program of the service device, and the web contents providing program of the service device provides prepared control codes (for example, web contents or extension module) in response to the request. When receiving the control codes, the web contents execution program prepares to utilize the control codes. When the control codes are web contents for device control/service, the web contents execution program performs an operation of loading the web contents. When the control codes are an extension module (for example, plug-in program or various application programs), an installation operation is executed.

Through such an operation, the web contents execution program is provided with a screen for controlling and utilizing the device service, and a user performs various manipulations on the control/service screen. The web contents execution program provides a request corresponding to the user's manipulation to the web contents providing program, and the web contents providing program of the service device provides an operation or service according to the request. At this time, the request provided to the service device form the smart terminal is not previously possessed by the web contents execution program. In the case of the web contents, the request corresponds to a request defined in a button image or text, and in the case of the extension module, the request corresponds to a request which is previously programmed in software codes of the extension module. Since the extension module is stored in the service device, the smart terminal does not need to have related information in advance.

Figure 2:
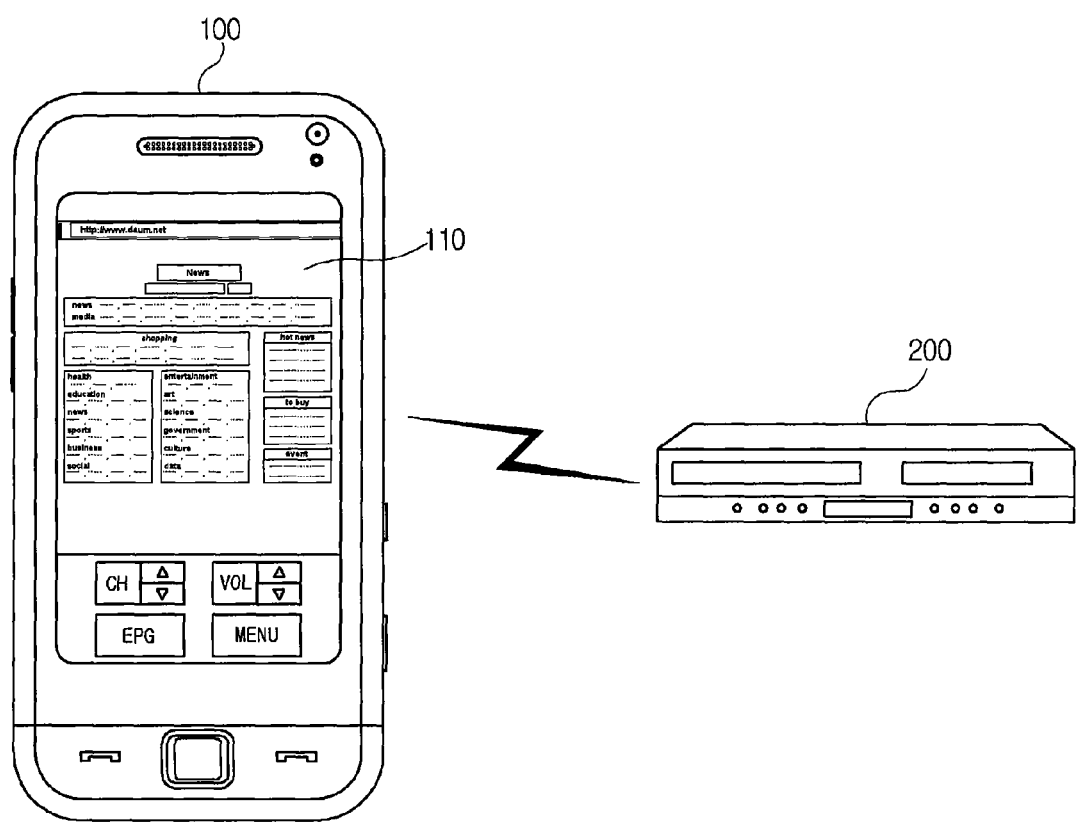
FIG. 2 is a diagram illustrating an example in which a set-top box is controlled by using a smart terminal.
Figure 3:
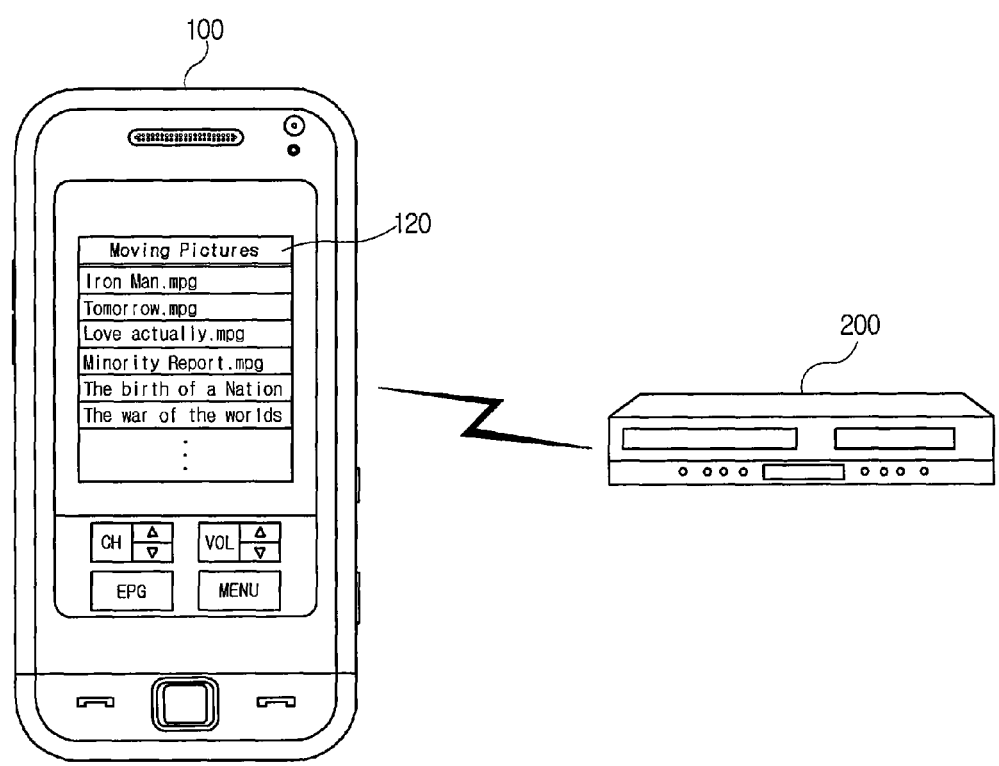
FIG. 3 is a diagram illustrating another example in which a set-top box is controlled by using a smart terminal.
Figure 4:
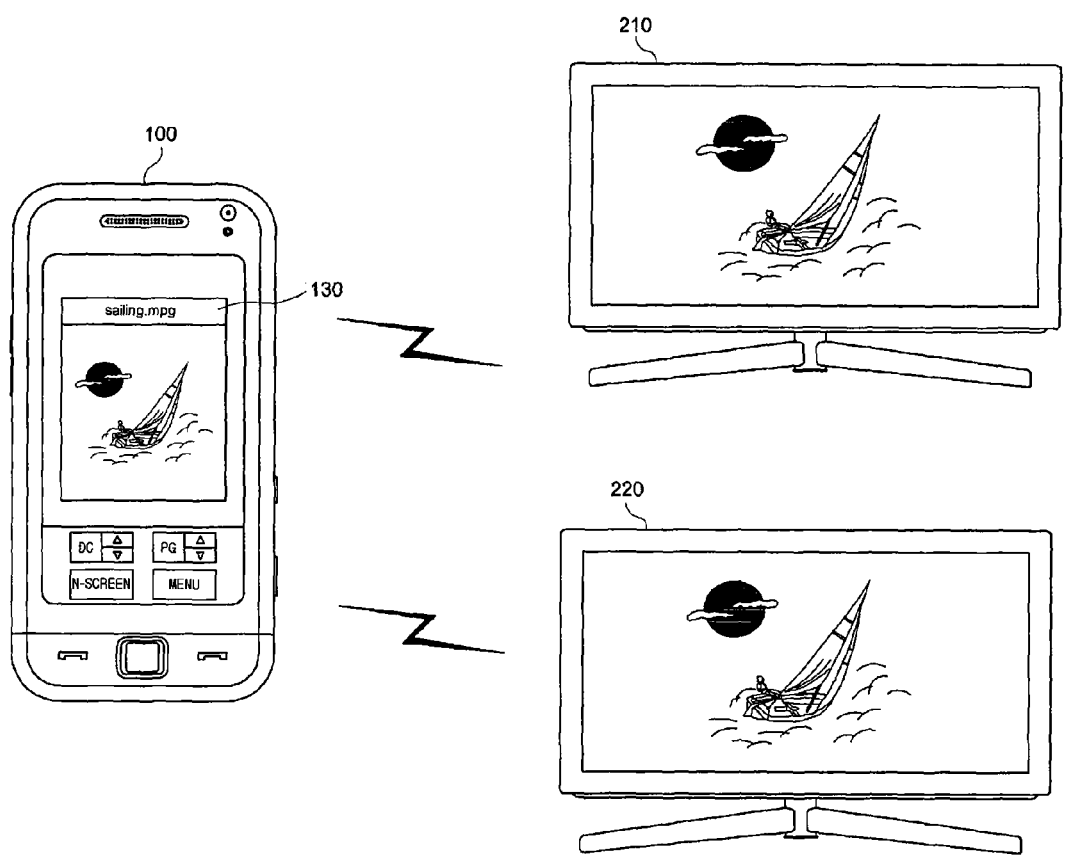
FIG. 4 is a diagram illustrating an example in which an N screen is implemented according to the embodiment of the present invention.

FIGS. 2 to 4 are diagrams illustrating examples in which the device control technology is implemented in various systems according to the technical idea of the present invention. Referring to FIG. 2, a smart phone 100 includes a button for controlling a set-top box 200, which is provided in the lower side of a screen of a browser 110. The device control button screen is not previously provided in the smart phone 100, but provided in the form of web-contents or application from a web server built in the set-top box 200. In this embodiment, an extension module is implemented as an application. When a user presses a channel up/down button or volume up/down button on the screen of the browser 110, a corresponding request is transmitted to the web server of the set-top box 200 from the browser 110, and the set-top box 200 performs an operation corresponding to the request.

Referring to FIG. 3, a list of video files stored in the set-top box 200 is displayed on a browser 120 of the smart phone 100. The browser 120 receives and displays information on the internal state of the set-top box 200, and the operation is performed according to the web contents or application provided from the web server of the set-top box 200. Even when the user presses an electronic program guide (EPG) button in the lower side of the browser 120, the set-top box 200 collects program information of broadcasting channels, forms an EPG, and provides the result to the browser 120 through the web server.

Referring to FIG. 4, an N screen is implemented by using the device control technology according to the embodiment of the present invention. The N screen refers to a service which enables a user to use contents in a plurality of devices such as TV, PC, tablet PC, and smart phone without disconnection. Through the N screen, contents possessed by a user may be utilized in a plurality of terminals.

First, a user sequentially places the smart terminal 100 near a plurality of display device to form communication channels based on the NFC. Such a configuration may be implemented through the above-described extension module. In the case of the extension module, when the user selects an N screen option of the smart terminal, contents which have been executed in the smart terminal may be executed in the service device. Accordingly, the N screen may be implemented. In the case of the web contents execution program (browser), the web contents execution program transmits contents such as pictures/videos stored in a recording medium of the smart terminal to the web server, based on standardized web technology. As the service device receiving the contents executes the content, it is possible to implement the N screen.

Figure 5:
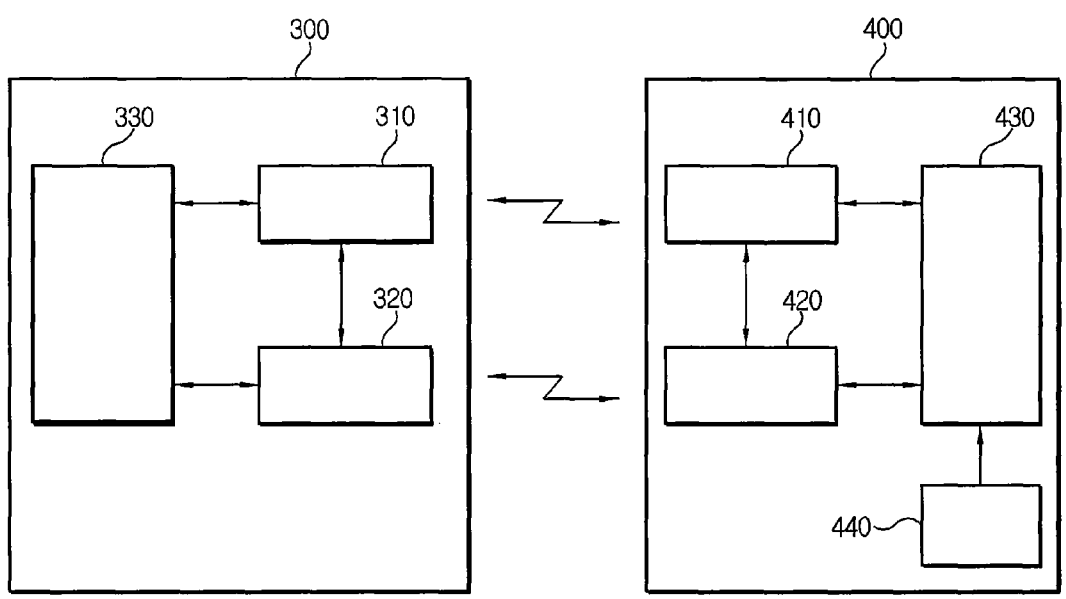
FIG. 5 is a diagram illustrating a device control system according to an embodiment of the present invention.

FIG. 5 is a diagram showing a device control system based on the NFC according to another embodiment of the present invention. The device control system according to the embodiment of the present invention includes a smart terminal 300 and a service device 400. A user figures out the state of the service device 400, controls various functions, and utilizes various services by using the smart terminal 300.

The smart terminal 300 and the service device 400 include NFC modules 310 and 410 and WiFi modules 320 and 420, respectively. The NFC modules 310 and 410 are configured to perform NFC, and the WiFi modules 320 and 420 are configured to provide a high-speed communication interface. In addition, the smart terminal 300 includes a browser 330 which is configured to provide a user interface such that the user may control various functions of the service device 400 and utilize the device service 400.

Furthermore, the service device 400 includes control codes 440 and a web server 430. The control codes 440 are previously provided in the service device 400 such that an external device may control the functions of the service device 400 and utilize various device services through the control codes 440. The web server 430 is configured to enable communication for the utilization. Through the configuration, the service device 400 performs communication with the browser 330, provides the control codes 440 to the browser 330, and receives various requests for function control and device service. In this embodiment, the web server 430 is provided as the web contents providing program.

The smart terminal 300 and the service device 400 include the NFC module 310 and 410 for performing NFC. As both of the smart terminal 300 and the service device 400 include the NFC modules 310 and 410, respectively, the user may place the smart terminal 300 near the service device 400, for example, within about 20 cm. Then, the NFC between both devices 300 and 400 is automatically activated according to the NFC technology standards such that the devices 300 and 400 may identify each other.

Furthermore, the smart terminal 300 and the service device 400 include the WiFi modules 320 and 420 for providing a high-speed communication interface. In addition to the WiFi, a variety of communication technologies including Bluetooth, Zigbee, and UWB may be properly selected as a secondary network. In this embodiment, the WiFi is used as the secondary network. When the WiFi is used as the secondary network, peer-to-peer connection may be easily established, high communication speed may be guaranteed, and a HTTP/TCP/IP protocol between the browser and the web contents providing program may be easily implemented.

The smart terminal 300 and the service device 400 secure a communication channel through the activated NFC, and are automatically handed over to the WiFi according to a procedure defined in the NFC standards. More specifically, the smart terminal 300 and the service device 400 read each other's NFC tags through the NFC channel, and acquire information on the WiFi hand-over through the read NFC tags. Then, when the smart terminal 300 and the service device 400 confirm that both devices support the WiFi hand-over, the smart terminal 300 and the service device 400 automatically perform the WiFi hand-over.

The service device 400 has the control codes 440 in advance such that an external device, that is, the smart terminal 300 may control all or a part of various functions and services provided by the service device 400. When a set-top box is taken as an example, switching a channel or changing various device setups correspond to the function control. On the other hand, checking an EPG or various broadcasting services corresponds to the device service. The control codes 440 may be provided in the form of web contents or provided in the form of extension module (for example, iOS application, android application, or plug-in program).

Furthermore, the service device 400 includes the web server 330 which performs communication with the browser 330 of the smart terminal 300 to provide the control codes 440 to the smart terminal 300 and receives various requests provided from the browser 330 to perform device control according to the requests. The web server 430 implements a service for the request from the browser 330 through various programming techniques, for example, a common gateway interface (CGI) and so on. Through the implemented service, the device control or various services may be performed.

The smart terminal 300 includes the browser 330 for providing a user interface. The browser 330 displays a screen for controlling the service device 400 based on the control codes provided from the web server 430, and receives a user manipulation on the screen. When the control codes 440 are web contents, such web contents as shown in FIGS. 2 to 4 may be displayed on the browser 330. In this case, when a user performs a manipulation (for example, button click) on the web contents, the browser 330 detects such an event. Furthermore, when the control codes 440 are an extension module, the extension module is installed in the smart terminal 300. According to contents programmed in the extension module, the extension module may utilize the functions of the smart terminal and calculate the result value.

The browser 330 provides a request corresponding to such a user manipulation to the web server 430. At this time, the request provided by the browser 330 is decided according to contents defined in the control codes 440. For example, when the web contents are displayed, a user may click a specific button, for example, a channel-up (CH-UP) button on a web contents screen for control. Then, a request defined for the button is provided to the web server 430. When the extension module is installed to display an execution screen, a user may execute a specific manipulation on the execution screen. Then, an execution result value by the corresponding extension module program is provided to the web server 430. At this time, the result value is provided in such a form as defined in the extension module program, for example, codes or message.

When such a request is provided, the web server 430 provides a service corresponding to the request such that the service may be executed in the service device 400. In the example of FIG. 2, when a request defined in the channel-up button is provided, a channel-up operation may be performed. In the example of FIG. 3, when a request for a video list is provided, information on videos stored in the service device 400 may be collected, and a list of the videos may be provided to the browser 330. In the example of FIG. 4, when a request to execute the N screen is provided, a screen provided from the smart terminal may be displayed as it is.

Figure 6:
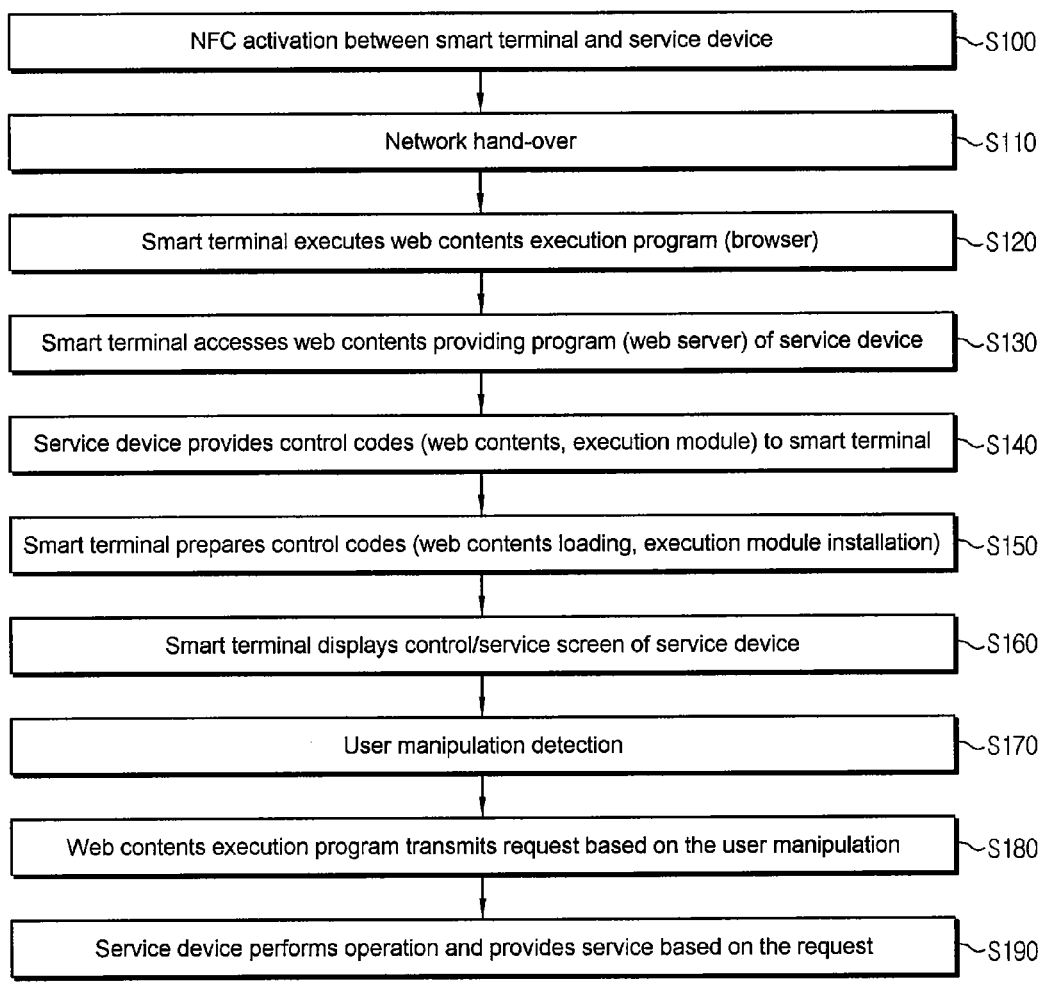
FIG. 6 is a flow chart showing a device control method according to another embodiment of the present invention.

FIG. 6 is a flow chart showing the device control method based on the NFC according to the embodiment of the present invention. Most of the technical configuration of the device control method according to the embodiment of the present invention has been already described with reference to FIGS. 1 to 5. Hereinafter, only the process flow will be briefly described. The orders of the respective steps are not limited to those shown in FIG. 6. That is, the orders may be changed without departing from the spirit and scope of the present invention.

Step S100: As a user places the smart terminal 300 near the service device 400, for example, within about 20 cm, the NFC between both devices 300 and 400 is automatically activated.

Step S110: According to a procedure defined in the NFC standards, the smart terminal 300 and the service device 400 are automatically handed over to a secondary network, desirably, the WiFi. Specifically, the smart terminal 300 and the service device 400 read each other's NFC tags through an NFC channel, and acquire information on the WiFi hand-over through the NFC tags. Then, when the smart terminal 300 and the service device 400 confirm that both devices support the WiFi hand-over, the smart terminal 300 and the service device 400 automatically perform the WiFi hand-over.

Step S120: The smart terminal 300 performs the web contents execution program. In the above descriptions, the browser 330 has been taken as an example of the web contents execution program. In this embodiment, however, another web contents execution program having a different form from the browser may be used. The web contents execution program may provide a viewing function. Furthermore, the web contents execution program not only may display the control codes 440 received from the service device 400 to a user, but also may detect a user's instruction on the displayed screen.

Step S130: The smart terminal 300 accesses the service device 400 through the secondary network. The service device 400 includes the web contents program. Accordingly, the web contents execution program of the smart terminal 300 accesses the web contents providing program of the service device 400.

Step S140: The service device 400 provides the control codes 400, which are used to control the function of the service device or provide the device service, to the smart terminal 300. The service device 400 has the control codes 440 in advance such that an external device, that is, the smart terminal 300 may control all or a part of various functions and services provided by the service device 400. The control codes 440 may be provided in the form of web contents or provided in the form of an extension module (for example, iOS application, android application, plug-in program, or active-X program). The service device 400 performs communication with the web contents execution program of the smart terminal 300 and provides the control codes 440 to the smart terminal 300.

Step S150: When receiving the control codes 440, the web contents execution program of the smart terminal 300 prepares the utilization of the control codes 440. When the control codes 440 are web contents, the web contents execution program (browser) loads the web contents. When the control codes 440 are an extension module, the extension module is installed in the smart terminal 300.

Step S160: A control/service screen for the service device 400 is displayed by the web contents execution program of the smart terminal 300. That is, as the browser 330 loads the web contents or installs the extension module, the screen for controlling the service device 400 or receiving various device services is provided to the user.

Step S170: The user performs various manipulations on the control/service screen, and the web contents execution program detects such a user manipulation. When the control codes 440 are web contents, the browser 330 detects various manipulations (for example, button click) performed by the user on the web contents displayed on the browser 330. When the control codes 440 are an extension module, the extension module utilizes the function of the smart terminal, and calculates the result value.

Step S180: As the user manipulation is detected, the web contents execution program transmits a request corresponding to the user manipulation to the service device 400. When the web contents are displayed and the user clicks a specific button on the web contents screen for control, a request defined in the button is provided to the web contents providing program. When the extension module is installed, the extension module utilizes the function of the smart terminal, and calculates the result value to provide to the web contents providing program.

Step S190: When such a request is provided to the service device 400 from the smart terminal 300, the service device 400 executes an operation corresponding to the request or provides a device service corresponding to the request. For example, when a channel-up message is provided, the service device 400 may perform a channel-up operation. When a video list request message is provided, information on videos stored in the service device 400 may be collected, and the list may be provided to the browser 300. When an EPG request message is provided, an EPG for broadcasting channels of the service device 400 is formed and then provided to the browser 330.

According to the embodiments of the present invention, even when control programs for individual service devices (for example, set-top box, digital TV, refrigerator, air conditioner, electronic frame and so on) are not previously installed in a smart terminal, a user may simply contact the smart terminal with the service devices and control the device devices through the smart terminal. Therefore, it is possible to improve the convenience of management using a smart terminal.

What is claimed is:

1. A method for controlling a service device through a smart terminal based on near field communication (NFC), the method comprising the steps of:
   (a) activating NFC between the smart terminal and the service device;
   (b) handing over the communication between the smart terminal and the service device to a secondary network through the NFC;
   (c) executing, by the start terminal, a web contents execution program;
   (d) providing, by the service device, control codes to the smart terminal;
   (e) preparing, by the smart terminal, to utilize the control codes;
   (f) displaying, by the smart terminal, a control/service screen of the service device on the web contents execution program by utilizing the control codes;
   (g) detecting, by the web contents execution program, a user manipulation on the control/service screen; and
   (h) transmitting, by the web contents execution program, a request defined in the control codes to the service device in response to the user manipulation.

2. The method according to claim 1, wherein the step (b) comprises the steps of:
   (b1) reading, by the smart terminal and the service device, each other's NFC tags through the NFC;
   (b2) deciding hand-over according to a result obtained by reading the NFC tags; and
   (b3) performing, by the smart terminal and the service device, a hand-over to the secondary network.

3. The method according to claim 1, wherein the web contents execution program comprises a browser,
   the control codes comprise web contents for function control and device services of the service device,
   the step (d) comprises the steps of:
   (d1) accessing, by the browser, a web contents providing program of the service device;
   (d2) requesting, by the browser, the control codes for the web contents providing program; and
   (d3) providing, by the web contents providing program, web contents of the service device to the browser in response to the request,
   the step (e) comprises the step of loading, by the browser, the web contents, and
   the step (h) comprises the step of transmitting, by the browser, a request defined in a user manipulation point on the web contents to the web contents providing program of the service device.

4. The method according to claim 1, wherein the web contents execution program comprises a browser,
   the control codes comprise an extension module for utilizing a function of the smart terminal,
   the step (e) comprises the step of installing, by the browser, the extension module, and
   the step (h) comprises the step of transmitting, by the extension module, a request corresponding to a user manipulation to the web contents providing program of the service device.

5. A service device control system based on near field communication (NFC), comprising:
   a smart terminal, having a first memory and a first processor, performing a hand-over to a secondary network when the smart terminal is connected to an external service device through NFC; executing a web contents execution program; receiving control codes from the service device by requesting the control codes; and displaying a control/service screen of the service device on the web contents execution program by utilizing the control codes, wherein the web contents execution program transmits a request defined in the control codes to the service device when a user manipulation on the control/service screen is detected; and
   a service device, having a second memory and a second processor, performing a hand-over to the secondary network when the service device is connected to an external smart terminal through NFC; providing control codes in response to a request from the smart terminal; and executing an operation corresponding to a request defined in the control codes when the request is provided from the smart terminal.

6. A non-transitory computer readable medium having first and second portions, each of the portions storing computer instructions for use in a device control system based on near field communication (NFC), comprising:
   the first portion of the computer-readable storage medium storing computer instructions which, when executed by a first processor cause the first processor in a smart terminal to execute:
   performing a hand-over to a secondary network when the smart terminal is connected to an external service device through NFC; and
   implementing a browser, wherein the browser accesses a web contents providing program of the service device to request device control web contents of the service device, loading the device control web contents to display a control/service screen of the service device when receiving the device control web contents from the service device, and transmitting a request defined in a user manipulation point on the web contents to the web contents providing program of the service device, when detecting a user manipulation on the control/service screen; and
   the second portion of the non-transitory computer-readable storage medium storing the computer instructions which, when executed by a second processor cause the second processor in a service device to execute:
   performing a hand-over to the secondary network when the service device is connected to an external smart terminal through NFC; and
   providing a web contents providing program, wherein the web contents providing program provides device control web contents in response to a request from the smart terminal, and performing an operation corresponding to a message defined in the device control web contents, when the message is provided from the smart terminal.

7. A non-transitory computer readable medium having first and second portions, each of the portions storing computer instructions for use in a device control system based on near field communication (NFC), comprising:
   the first portion of the computer-readable storage medium storing computer instructions which, when executed by a first processor cause the first processor in a smart terminal to execute:
   performing a hand-over to a secondary network when the smart terminal is connected to an external service device through NFC; and
   implementing a browser, wherein the browser accesses a web contents providing program of the service device to receive and install an extension module from the service device, and displaying a control/service screen based on the installed extension module, and the extension module transmit a request based on a user manipulation and a function execution result value of the smart terminal to the web contents providing program of the service device, when a user manipulation on the control/service screen is detected; and
   the second portion of the non-transitory computer-readable storage medium storing the computer instructions which, when executed by a second processor cause the second processor in a service device to execute:
   performing a hand-over to the secondary network when connected to an external smart terminal through NFC; and
   providing a web contents providing program, wherein the web contents providing program provides an extension module for device control in response to a request from the smart terminal and performing an operation corresponding to a request defined in the extension module when the request is provided from the smart terminal.

* * * * *